United States Patent
Yang et al.

(10) Patent No.: US 7,438,193 B2
(45) Date of Patent: Oct. 21, 2008

(54) NANOPOROUS MEMBRANE AND METHOD OF FABRICATING THE SAME

(75) Inventors: Seung Yun Yang, Pohang (KR); Jin Kon Kim, Pohang (KR); Min Soo Park, Pohang (KR); Incheol Ryu, Pohang (KR); Sung Key Jang, Pohang (KR); Hwang Yong Kim, Pohang (KR); Thomas P. Russell, Amherst, MA (US)

(73) Assignees: Postech Foundation, Pohang (KR); Postech Academy-Industry Foundation, Pohang (KR)

( * ) Notice: Subject to any disclaimer, the term of this patent is extended or adjusted under 35 U.S.C. 154(b) by 134 days.

(21) Appl. No.: 11/403,870

(22) Filed: Apr. 14, 2006

(65) Prior Publication Data

US 2007/0080107 A1    Apr. 12, 2007

(30) Foreign Application Priority Data

Oct. 12, 2005    (KR) .................. 10-2005-0096239

(51) Int. Cl.
 *B01D 29/00* (2006.01)
 *B01D 39/00* (2006.01)
 *B01D 39/14* (2006.01)
 *B31D 3/00* (2006.01)
 *B05D 3/04* (2006.01)

(52) U.S. Cl. ............ 210/490; 210/500.27; 210/500.34; 210/500.4; 210/500.28; 210/500.36; 216/56; 427/307; 427/309

(58) Field of Classification Search ............ 210/500.27, 210/490, 500.34, 500.36, 500.4, 500.28; 264/42, 45.1, 152, 156, 349, 340; 216/56; 427/307, 309

See application file for complete search history.

(56) References Cited

U.S. PATENT DOCUMENTS

| | | | | |
|---|---|---|---|---|
| 3,770,532 A | * | 11/1973 | Bean et al. ............. | 216/56 |
| 3,850,762 A | * | 11/1974 | Smith .................... | 205/75 |
| 4,280,909 A | * | 7/1981 | Deutsch ................. | 210/490 |
| 5,904,846 A | * | 5/1999 | Clements et al. ....... | 210/321.77 |
| 5,962,081 A | * | 10/1999 | Ohman et al. .......... | 427/534 |
| 6,565,763 B1 | * | 5/2003 | Asakawa et al. ....... | 216/56 |
| 6,676,904 B1 | * | 1/2004 | Lee et al. ............... | 422/101 |
| 6,716,444 B1 | * | 4/2004 | Castro et al. ........... | 424/422 |
| 6,824,827 B2 | * | 11/2004 | Katsuki et al. ......... | 427/307 |
| 6,861,006 B2 | * | 3/2005 | Ferain et al. ........... | 216/56 |
| 6,908,552 B2 | * | 6/2005 | Siwy et al. ............. | 210/500.39 |
| 7,037,425 B2 | * | 5/2006 | Lee et al. ............... | 210/321.75 |
| 7,118,923 B2 | * | 10/2006 | Lee et al. ............... | 436/518 |
| 2003/0047505 A1 | * | 3/2003 | Grimes et al. .......... | 210/483 |

FOREIGN PATENT DOCUMENTS

KR    1020050029603 A    3/2005

OTHER PUBLICATIONS

Mansky et al., Science, Mar. 7, 1997, pp. 1458-1460, vol. 275.

* cited by examiner

*Primary Examiner*—Ana M Fortuna
(74) *Attorney, Agent, or Firm*—Rothwell, Figg, Ernst & Manbeck (57) ABSTRACT

Provided are a nanoporous membrane and a method of fabricating the same. The nanoporous membrane includes a support, and a separation layer including a plurality of nano-sized pores at a density of $10^{10}/cm^2$ or greater and a matrix. The nanoporous membrane has a high flux and a high selectivity.

19 Claims, 11 Drawing Sheets

NANOPOROUS MEMBRANE AND METHOD OF FABRICATING THE SAME

CROSS-REFERENCE TO RELATED PATENT APPLICATIONS

This application claims the benefit of Korean Patent Application No. 10-2005-0096239, filed on Oct. 12, 2005, in the Korean Intellectual Property Office, the disclosure of which is incorporated herein in its entirety by reference.

BACKGROUND OF THE INVENTION

1. Field of the Invention

The present invention relates to a nanoporous membrane and a method of fabricating the same, and more particularly, to a nanoporous membrane including a support and a separation layer having a plurality of nano-sized pores at a density of $10^{10}/cm^2$ or greater and a matrix.

2. Description of the Related Art

Membrane filtration technologies are widely used throughout almost all industrial fields, for example, to produce ultrapure water in the electronics field, to separate medicines, such as protein, enzyme, antibody, etc., in the biotechnology field, or in a concentration process in the food industry. Membrane filtration technologies can be classified into microfiltration, ultrafiltration, nanofiltration, etc., according to the size of a material to be filtered.

In general, membranes used in such filtration technologies can be manufactured using polymer. A method of manufacturing a filtration membrane is disclosed in Korean Patent Laid-open No. 10-2005-0029603. Membrane manufacturing processes can be classified into processes of manufacturing a membrane having a nominal pore size and processes of manufacturing a membrane having an absolute pore size. Processes of manufacturing a membrane having a nominal pore size involve stretching, interfacial polymerization, phase-inversion, etc. Processes of manufacturing a membrane having an absolute pore size involve track-etching in which pores are formed through the irradiation of a radioactive element and corrosion for a predetermined time.

A membrane having a nominal pore size includes pores which are abnormally larger than the nominal pore size, has poor pore size uniformity on the surface thereof, and thus cannot be used to separate or purify a particular material with a high purity. Meanwhile, a membrane having an absolute pore size has high pore size uniformity on the surface thereof and thus can purify a material with a desired high purity. However, the membrane having an absolute pore size has a low surface pore density and a thick separation layer, which lower the flux of the membrane. Therefore, an improvement in this regard is required.

SUMMARY OF THE INVENTION

The present invention provides a nanoporous membrane with a pore density and pore size uniformity that are high enough to ensure a high flux and a high selectivity, and a method of fabricating the nanoporous membrane.

According to an aspect of the present invention, there is provided a nanoporous membrane comprising a support, and a separation layer including a plurality of nano-sized pores at a density of $10^{10}/cm^2$ or greater and a matrix.

According to another aspect of the present invention, there is provided a method of fabricating a nanoporous membrane, the method comprising: preparing a substrate; forming an etching layer on the substrate; coating a phase-separable copolymer-containing composition on the etching layer and thermally treating the same to form a phase-separated polymer layer; dipping the substrate having the phase-separated copolymer layer in an etching solution containing a support to fix the phase-separated copolymer layer to the support; dipping the support having the phase-separated copolymer layer in an acid solution to form nano-sized pores in the phase-separated copolymer layer, thereby resulting in a separation layer including a plurality of nano-sized pores and a matrix on the support.

According to another aspect of the present invention, there is provided a nanoporous membrane fabricated using the above-described method.

According to the present invention, the separation layer of the nanoporous membrane has a high pore density, high pore size uniformity, i.e., a small standard deviation of diameters of the pores, and a very small thickness. In addition, the separation layer is bound with a highly permeable support for great mechanical strength. Thus, the nanoporous membrane according to the present invention has a high flux and a high selectivity.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, the present invention will be described in detail with reference to the appended drawings.

Figure 1A:
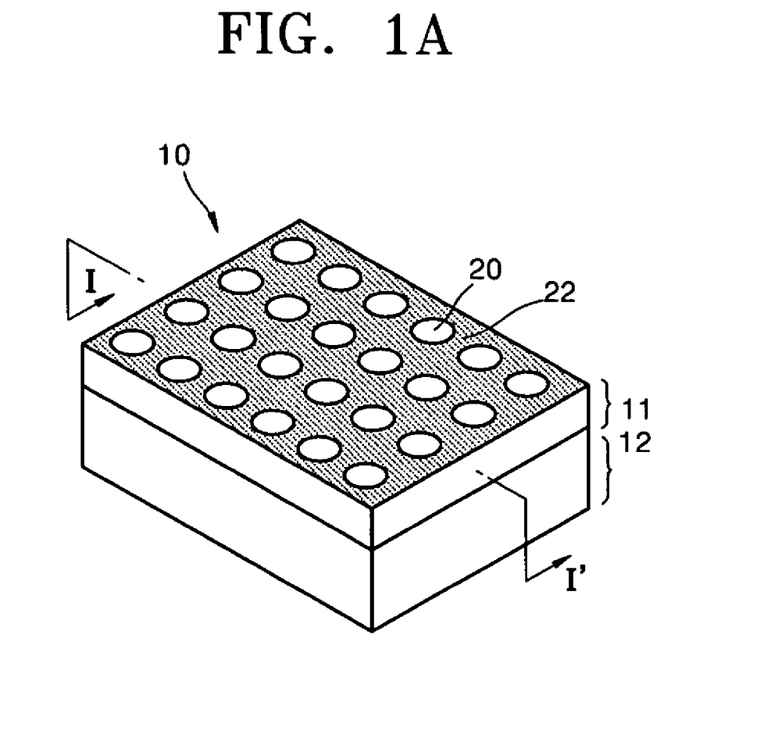
FIGS. 1A and 1B are respectively a perspective view and a sectional view of a nanoporous membrane according to an embodiment of the present invention.
Figure 1B:
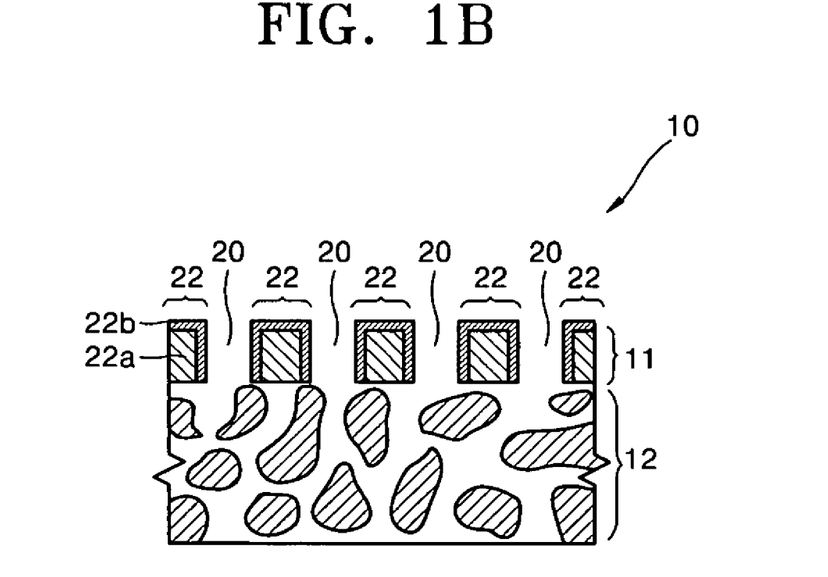

FIG. 1A is a perspective view showing a surface structure of a nanoporous membrane according to an embodiment of the present invention. FIG. 1B is a sectional view of the nanoporous membrane of FIG. 1A taken along line I-I'.

Referring to FIGS. 1A and 1B, a nanoporous membrane 10 according to an embodiment of the present invention includes a support 12 and a separation layer 11 having a plurality of nano-sized pores and a matrix 22.

The separation layer 11 has a filtration function. The separation layer 11 may have a pore density of 1010/cm2 or greater, for example, in a range of 1010/cm2-1012/cm2. The plurality of pores 20 in the separation layer 11 of the nanoporous membrane 10 may occupy about 20% or greater of the surface of the separation layer 11. Such a high pore density contributes to improving the flux of the nanoporous membrane.

The average diameter of the pores 20 in the separation layer 11 of the nanoporous membrane 10 can be adjusted by controlling the molecular weight of homopolymers consisting a phase-separable copolymer that can be used to prepare the separation layer 11 or by adding a homopolymer, in consideration of the size of a material to be filtered, for example, virus, impurities, etc. The average diameter of the pores 20 in the separation layer 11 of the nanoporous membrane 10 can be adjusted in a range of, for example, 6-40 nm, but is not limited thereto. Thus, the nanoporous membrane 10 according to the present invention is suitable for ultramicrofiltration, for example, filtration on the scale of a few to tens of nanometers, i.e., molecular level filtration.

The diameters of the pores 20 in the separation layer 11 of the nanoporous membrane 10 are very uniform. The uniformity of diameters of the pores 20 can be expected from the standard deviation of diameters of the pores 20. The standard deviation of diameters of the pores 20 in the separation layer 11 of the nanoporous membrane 10 according to the present invention may be 3 or less, for example, in a range of 0.0001-3. Since the nanoporous membrane 10 according to the present invention has a uniform pore diameter and can be used for filtration on the scale of several nanometers. In other words, the nanoporous membrane 10 according to the present invention has a high selectivity.

The pores 20 in the separation layer 11 of the nanoporous membrane 10 may penetrate through the separation layer 11 in a direction perpendicular to a surface of the support 12. In this case, the lengths of the pores 20, which serve as material flow paths, are shortest so that the flux of the nanoporous membrane 10 increases.

The matrix 22 of the separation layer 11 in the nanoporous membrane 10 includes an inner portion 22a and a surface portion 22b covering the inner portion 22a. For example, the inner portion 22a and the surface portion 22b can be composed of different polymers because a phase-separable copolymer can be used to form the separation layer 11. For example, the inner portion 22a can be formed of polystyrene while the surface portion 22b can be formed of polyacryl, polyisoprene, polyethylene oxide, or polybutadiene. However, the matrix 22 is not limited to this structure.

The separation layer 11 of the nanoporous membrane 10 may have a thickness of 10-200 nm, for example, 10-150 nm. In an embodiment, the separation layer 11 may have a thickness of 10-100 nm. When the separation layer 11 has a thickness less than 10 nm, it is difficult to obtain ordered nanostructures and detach the film from substrate. When the separation layer 11 has a thickness larger than 200 nm, the material flow paths are so long that the flux of the nanoporous membrane 10 decreases. The thickness of the separation layer 11 can be varied by controlling, for example, the coating rate of a phase-separable copolymer-containing composition described later.

The support 12 of the nanoporous membrane 10 maintains and supports the structure of the separation layer 11. The support 12 is formed of a material that is highly flowable and resistant against chemicals and can form a smooth surface. In addition, the material of the support 12 may be highly permeable to a material that has passed through the separation layer 11.

For example, the pore diameter of the support 12 may be 0.2 μm on average, for example, in a range of 0.05-0.5 μm on the surface of the support 12. The support 12 may be formed of, for example, a polysulfone polymer. However, any polymer membrane that has a higher permeability than the separation layer 11 and is resistant to acid. The thickness of the support 12 is not limited provided that the support 12 is thick enough to maintain and support the structure of the separation layer 11. When the support 12 is too thick, the material flow paths of the nanoporous membrane 10 are so long that the flux of the nanoporous membrane 10 decreases. In this view, the thickness of the support 12 may be, for example, 150 μm, but is not limited thereto. Commercially available products of various chemical companies can be used as the support 12.

As described above, since the separation layer 11 has a high pore density and an ultra-small thickness, the nanoporous membrane 10 according to the present invention has a high flux. In addition, due to a uniform pore size of the separation layer 11, the nanoporous membrane 11 has a high selectivity.

The pore density, average pore diameter, and standard deviation of pore diameters of the separation layer can be calculated through an analysis of the separation layer photographs obtained using field emission-scanning electron microscopy (FE-SEM) and/or atomic force microscopy (AFM), etc. This calculation method is disclosed in, for example, Polymer Engineering II, p. 370-372, Heejungdang, Sung-chul Kim et al., the disclosure of which is incorporated herein in its entirety by reference.

The present invention provides a method of fabricating a nanoporous membrane having the above-described structure, the method including: preparing a substrate; forming an etching layer on the substrate; coating a phase-separable copolymer-containing composition on the etching layer and thermally treating the same to form a phase-separated polymer layer; dipping the substrate having the phase-separated copolymer layer in an etching solution containing a support to fix the phase-separated copolymer layer to the support; dipping the support having the phase-separated copolymer layer in an acid solution to form nano-sized pores in the phase-separated copolymer layer, thereby resulting in a separation layer including a plurality of nano-sized pores and a matrix on the support.

A method of fabricating a nanoporous membrane according to an embodiment of the present invention will be described in detail with reference to FIGS. 2A through 2F.

Figure 2A:
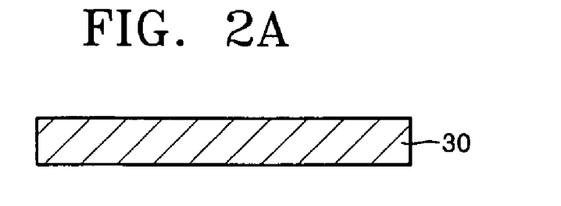
FIGS. 2A through 2F are sectional views for explaining a method of fabricating a nanoporous membrane, according to an embodiment of the present invention.

Referring to FIG. 2A, a substrate 30 is prepared. The substrate 30 transfers a phase-separated copolymer layer 42 onto a substrate 60. The substrate 30 is formed of a material which does not chemically react with the phase-separated copolymer layer 42. For example, the substrate 30 can be a silicon substrate.

Figure 2B:
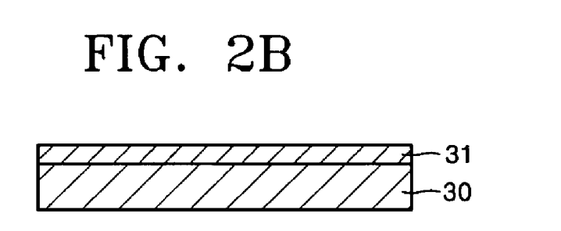

Next, referring to FIG. 2B, an etching layer 31 is formed on the substrate 30. The etching layer 31 allows the phase-separated copolymer layer 42 to be separated from the substrate 30 so that the phase-separated copolymer layer 42 can be transferred onto the support 60, as described below. The etching layer 31 is formed of a material which does not chemically react with the phase-separated copolymer layer 42 and which can be easily separated through a process. For example, the etching layer 31 can be formed of a metal oxide, for example, silicon oxide, which can be easily removed when contacting an acid solution. In addition, the etching layer 31 may have a thickness of 50 nm or greater. When the thickness of the etching layer 31 is too small, the phase-separated copolymer layer 42 cannot be smoothly separated from the substrate 30.

The etching layer 31 may be formed as a separate layer on the substrate 30 using a common deposition or coating method. For example, the etching layer 31 can be formed using a chemical vapor deposition method. Alternatively, the etching layer 31 may be formed by treating the surface of the substrate 30 using a common surface treatment method.

Figure 2C:
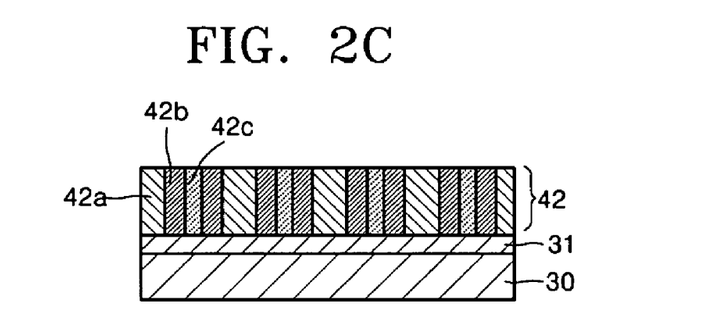

Next, referring to FIG. 2C, a phase-separated copolymer layer 42 is formed on the etching layer 31.

Before the phase-separated copolymer layer 42 is formed, the surface of the etching layer 31 may be optionally neutralized, treated with an electric field, or subjected to solvent vaporization such that different phase regions of the phase-separated copolymer layer 42 can be aligned perpendicular to the etching layer 31. This process can be performed using various common methods. For example, the surface of the etching layer 31 can be neutralized using random copolymer brushes (Refer to "Controlling Polymer-Surface Interaction with Random Copolymer Brushes", P. Mansky et al., SCIENCE, Vol. 275, 7 Mar. 1997, pp. 1458-1460).

The phase-separated copolymer layer 42 can be formed by coating a phase-separable copolymer-containing composition on the etching layer 31, which may be optionally neutralized, treated with an electric field, or subjected to solvent vaporization, and thermally treating the coated composition.

The phase-separable copolymer-containing composition contains a phase-separable copolymer and a solvent. The phase-separable copolymer is a copolymer that can form block phases by being self-assembled after being coated on the etching layer 31. Examples of the phase-separable copolymer include a copolymer including blocks consisting of different repeating units, such as a polystyrene-block-polyacryl copolymer, a polystyrene-block-polyisoprene copolymer, a polystyrene-block-polybutadiene copolymer, a derivative thereof, etc., but are not limited thereto.

The solvent in the phase-separable copolymer-containing composition can be any solvent that can dissolve or disperse the phase-separable copolymer. For example, the solvent can be toluene, THF, or benzene, but is not limited thereto.

In addition to the phase-separable copolymer and the solvent, the phase-separable copolymer-containing composition may further contain a homopolymer consisting of repeating units which are miscible with one of the blocks consisting the phase-separable copolymer. The homopolymer can control the pore diameter of the separation layer.

The phase-separated copolymer layer 42 in FIG. 2C is obtained by coating and thermally treating the phase phase-separable copolymer-containing composition containing a phase-separable copolymer, a solvent, and a homopolymer. The phase-separated copolymer layer 42 includes a first block region 42a and a second block region 42 in different phases, which are respectively formed from first and second blocks consisting the phase-separable copolymer, and a homopolymer region 42c surrounded by the second block region 42b. The homopolymer region 42c is formed from the homopolymer miscible with the second block in the phase-separable copolymer.

For example, 1 g of a phase-separable copolymer-containing composition can be obtained by mixing 0.01 g of poly- styrene-block-polymethylmethacrylate (PS-b-PMMA; 7:3 by volume fraction) copolymer used as a phase-separable copolymer and 0.0003 g (10% by weight of the PMMA block in PS-b-PMMA) of a PMMA homopolymer that is miscible with the PMMA of the phase-separable copolymer, and adding toluene to the mixture. When this phase-separable copolymer-containing composition is used to form the phase-separated copolymer layer 42 of FIG. 2C, the first block region 42a is composed of polystyrene, the second block region 42b is composed of the PMMA derived from the PS-b-PMMA copolymer, and the homopolymer region 42c is composed of the PMMA derived from a PMMA homopolymer. The average pore diameter of a separation layer obtained using the composition is 3 nm larger than the average pore diameter of a separation layer obtained through the same processes as described above but using a composition not containing the PMMA homopolymer.

A suitable homopolymer can be used according to the selected phase-separable copolymer. Examples of the homopolymer that can be used in the present invention include a polyacryl homopolymer, a polyisoprene homopolymer, a polybutadiene homopolymer, a derivative thereof, etc., but are not limited thereto.

Figure 2D:
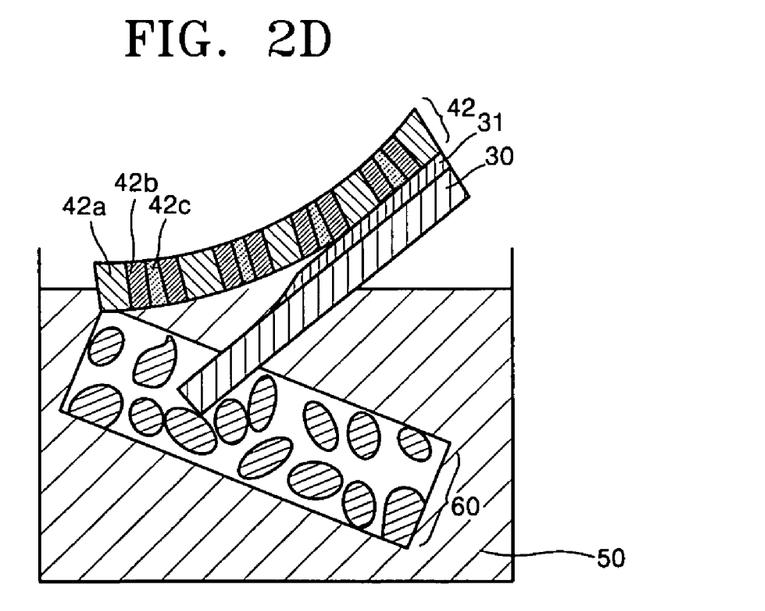

Next, referring to FIG. 2D, the substrate 30 with the phase-separated copolymer layer 42 is dipped in an etching solution 50 in which the support 60 is immersed to fix the phase-separated copolymer layer 42 to the support 60. In particular, as the etching layer 31 between the phase-separated copolymer layer 42 and the substrate 30 is dissolved in the etching solution 50, the phase-separated copolymer layer 42 is separated from the substrate 30 and fixed to the support 60.

The etching solution 50 may have a composition that can dissolve the etching layer 31 but does not chemically react with the phase-separated copolymer layer 42. Examples of the etching solution 50 that can be used in the present invention include an aqueous hydrofluoric acid solution, an aqueous phosphoric acid solution, an aqueous hydroxide solution, etc., but are not limited thereof. The concentration of the etching solution 50 may be in a range of 5-30 wt %. When the concentration of the etching solution 50 is less than 5 wt %, the etching layer 31 cannot be effectively removed. When the concentration of the etching solution 50 exceeds 30 wt %, the phase-separated copolymer layer 42 may be damaged in addition to the etching layer 50.

The support 60 immersed in the etching solution 50 is the same as described above.

Figure 2E:
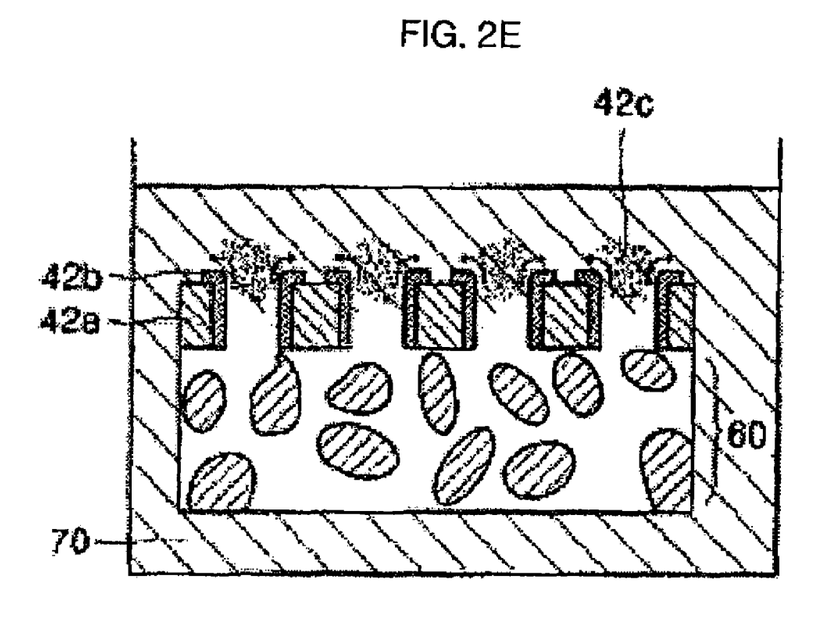
Figure 2F:
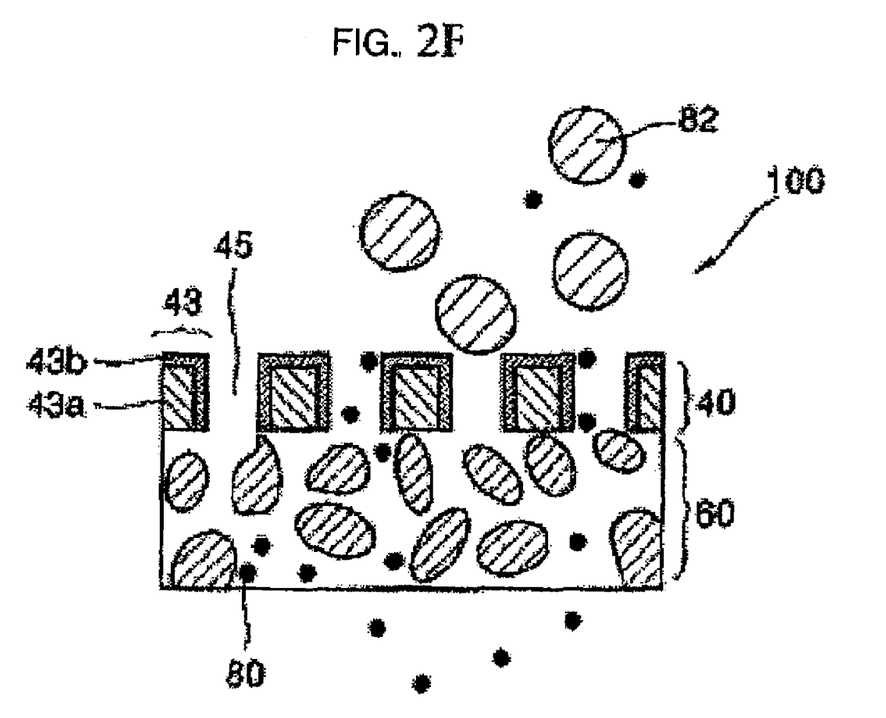

Next, the support 60 to which the phase-separated copolymer layer 42 is fixed is immersed in an acid solution 70, as illustrated in FIG. 2E, to form nano-sized pores in the phase-separated copolymer layer 42, thereby resulting in a separation layer including a plurality of nano-sized pores and a matrix on the support 60. As a result, a nanoporous membrane 100 illustrated in FIG. 2F is completed. Here, referring to FIG. 2E, the homopolymer region 42c of the phase-separated copolymer layer 42 is dissolved in the acid solution 70 and forms pores 45 in the separation layer 40 of the nanoporous membrane 100 in FIG. 2F. In addition, the second block region 42b of the phase-separated copolymer layer 42 swells in directions indicated by the arrows in FIG. 2E and covers the first block region 42a. As a result, an inner portion 43a and a surface portion 43b of the matrix 43 in the separation layer 40 of the nanoporous membrane 100 are completed.

The acid solution 70 used to form the pores 45 can be any acid solution that can swell one of the blocks of the selected phase-separable copolymer. When a homopolymer is additionally used, an acid solution that also can dissolve the homopolymer should be used. Examples of the acid solution that can be used in the present invention include acetic acid, isopropyl alcohol, etc., but are not limited thereto. The concentration of the acid solution may be in a range of 10-50 wt %. When the concentration of the acid solution is less than 10 wt %, one of the blocks of the phase-separable copolymer cannot effectively swell, and thus the pores cannot be smoothly formed. When the concentration of the acid solution exceeds 50 wt %, the manufacturing costs are high.

The obtained nanoporous membrane 100 does not allow a material 82, such as virus, various impurities, etc., having tens to hundreds of nanometers to pass, but allows a proton 80 to pass.

The pore density, average pore diameter, and standard deviation of pore diameters of the nanoporous membrane 100, the thickness of the support 60, the thickness of the separation layer 40 are the same as described above.

A nanoporous membrane according to the present invention can be used as a filter membrane in a process of purifying high-purity medicines or nanoparticles or to filtrate various contaminants including viruses in a process of producing ultrapure water, foods, biochemical-related materials, etc.

Hereinafter, the present invention will be described in greater detail with reference to the following examples. The following examples are only for illustrative purposes and are not intended to limit the scope of the invention.

EXAMPLE

A silicon substrate having a size of 3 cm$^2$×3 cm$^2$ was prepared, and a silicon oxide layer having a thickness of 100 nm was formed as an etching layer on the silicon substrate through thermal chemical vapor deposition (CVD) at 1000° C. in an oxygen atmosphere.

A solution of 1 wt % of a polystyrene-random-polymethylmethacrylate (PS-random-PMMA) copolymer (synthesized through atomic transfer radical polymerization (ATRP) and having a 58:42 volume ratio of polystyrene to polymethylmethacrylate) in toluene was spin-coated on the silicon oxide layer at 1000 rpm for 60 seconds and thermally treated in a vacuum oven at 170° C. for 48 hours to form a PS-random-PMMA copolymer layer having a thickness of 100 nm to neutralize the silicon oxide layer. Next, the substrate was washed with toluene.

0.0194 g of a polystyrene-block-polymethylmethacrylate (PS-b-PMMA) copolymer (synthesized through ATRP and having a 70:30 volume ratio of polystyrene to polymethylmethacrylate, a weight average molecular weight (Mw) of 89,000, and a polydispersity index (PDI) of 1.04) as a phase-separable copolymer was added into 0.0583 g of a solution of 1 wt % of a PMMA homopolymer (available from Polymer Source Co., Mw=29,800, and PDI=1.08) in toluene, and toluene was further added into the mixture to obtain 1 g of a phase-separable copolymer-containing composition. The weight of the PMMA homopolymer in the phase-separable copolymer-containing composition was 10% of the weight of the PMMA block of the PS-b-PMMA copolymer.

The phase-separable copolymer-containing composition was spin-coated on the silicon oxide layer at 2500 rpm for 60 seconds and thermally treated in a vacuum oven at 170° C. for 24 hours to form a 80-nm-thick phase-separated copolymer layer composed of the PS-b-PMMA copolymer and the PMMA homopolymer.

Next, a polysulfone membrane (HT-Tuffryn, available from Pall Co.), a disc type membrane having a diameter of 2.5 cm, a pore size of 0.2 μm, and a thickness of 150 μm, was prepared as a support. The support was immersed in a 10 wt % hydrofluoric acid solution. Next, the substrate with the phase-separated copolymer layer was dipped in the hydrofluoric acid solution. As the silicon oxide layer dissolved in the hydrofluoric acid solution, the phase-separated copolymer layer on the silicon oxide layer was fixed on the support.

The support to which the phase-separated copolymer layer was fixed was dipped in a 30 wt % acetic acid solution to dissolve the PMMA homopolymer in the phase-separated copolymer layer and allow PMMA of the PS-b-PMMA copolymer to swell, thereby resulting in pores in the phase-separated copolymer layer. As a result, a nanoporous membrane including a separation layer having nano-sized ports and a matrix and the support was completed. The nanoporous membrane was referred to as "Membrane 1".

Comparative Example A

A track-etched polycarbonate (PC) membrane (Nuclepore, available from Whatman) was prepared and referred to as "Membrane A". The average pore diameter and the thickness of Membrane A were 15 nm and 6.5 μm, respectively.

Comparative Example B

An AAO membrane (having pores formed by electrochemically processing an aluminum plate, Anodisc, available from Whatman) was prepared and referred to as "Membrane B". The average pore diameter and the thickness of Membrane B were 20 nm and 60 μm, respectively.

Evaluation Example 1

Observation of Surface and Cross-Section of Nanoporous Membrane

Figure 3A:
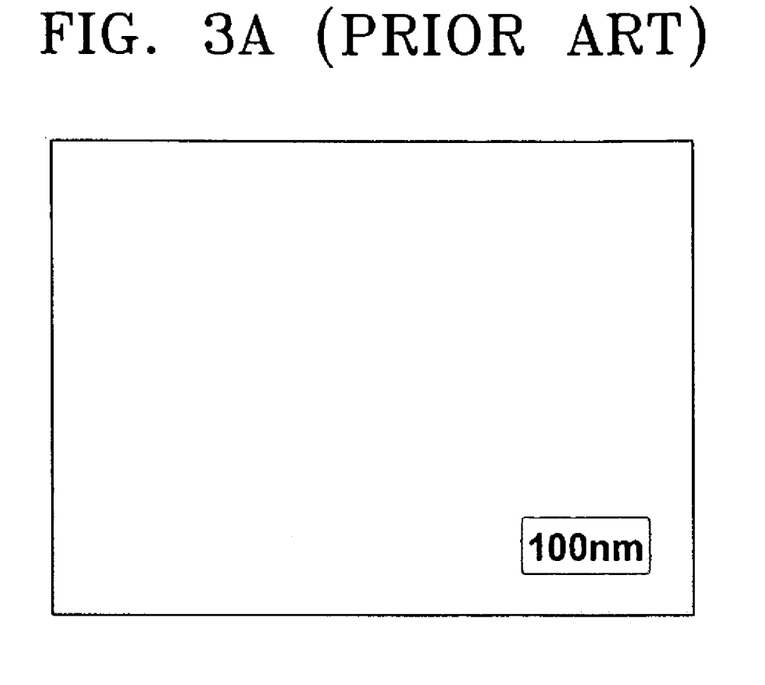
FIGS. 3A and 3B are photographs of a surface and a cross-section of a conventional porous membrane.
Figure 3B:
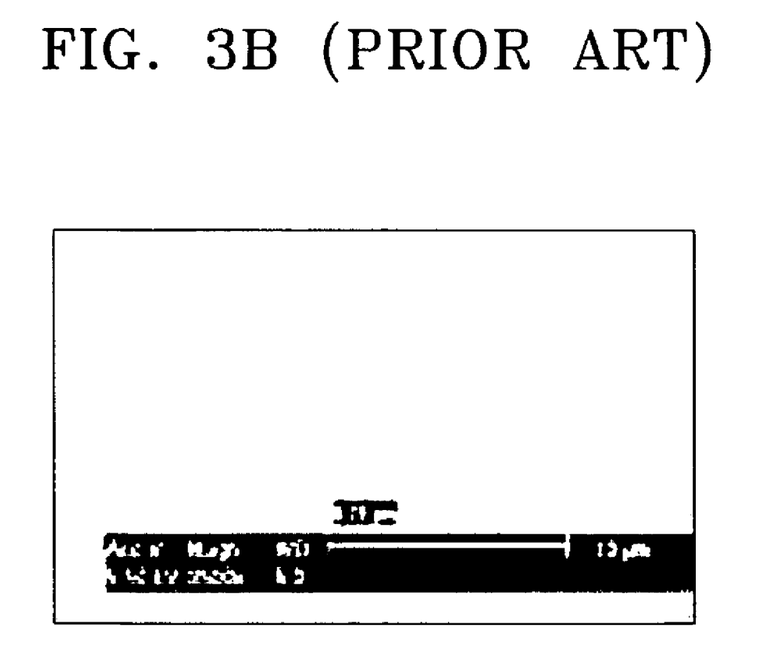

The surfaces and cross-sections of Membrane A and Membrane 1 were observed using field emission-scanning electron microscopy (FE-SEM, Hitachi S-4200) and atomic force microscopy (AFM, Digital Instrument Co.). FIGS. 3A and 3B are photographs of a surface and cross-section of Membrane A, FIGS. 4A and 4B are photographs of a surface and cross-section of a separation layer of Membrane 1, and FIGS. 4C and 4D are photographs of a surface and cross-section of a support of Membrane 1.

Figure 4A:
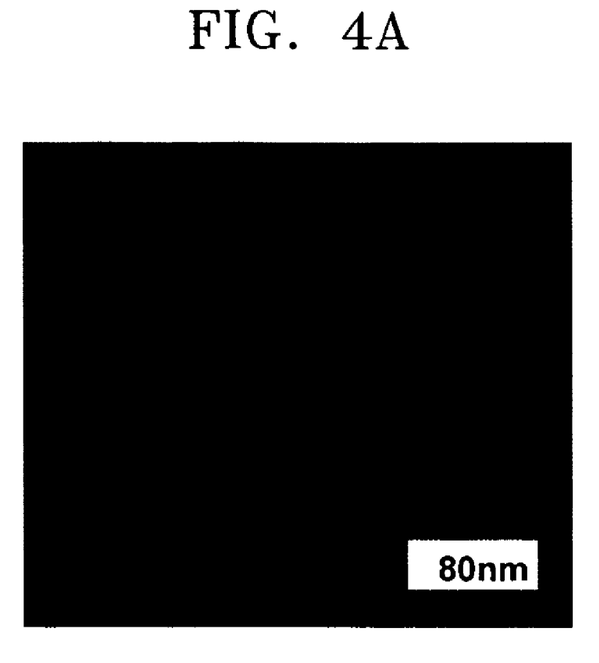
FIGS. 4A through 4D are photographs of the surfaces and cross-sections of a separation layer and a support of a nanoporous membrane manufactured in Example according to the present invention.
Figure 4B:
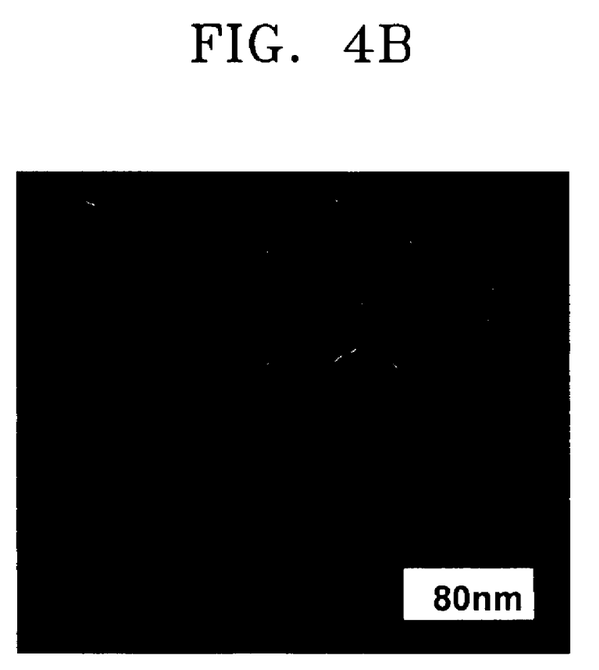
Figure 4C:
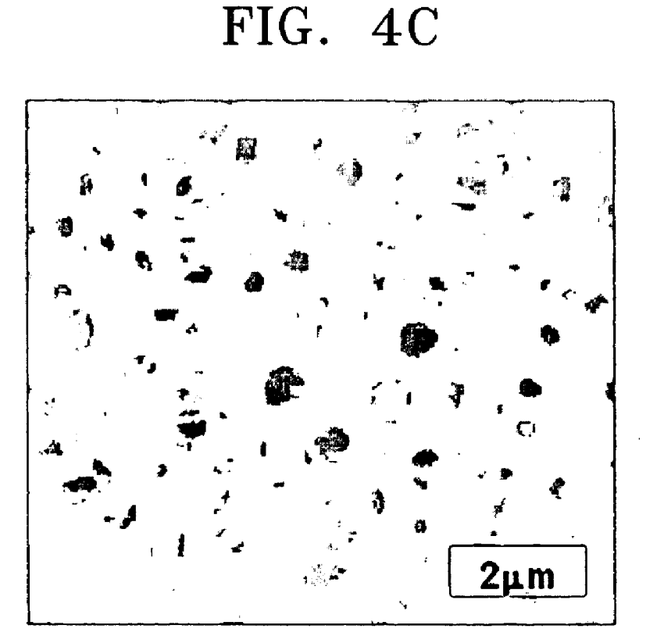
Figure 4D:
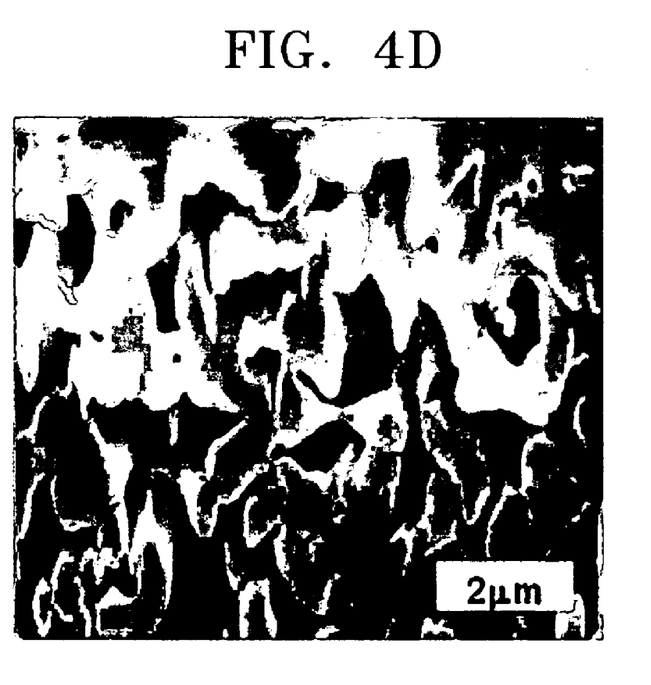

Referring to FIGS. 3A, 3B, 4A, and 4B, in which relatively dark portions in FIGS. 3A and 4A correspond to pores, Membrane 1 according to the present invention has a very higher pore density than Membrane A. In addition, the pores in Membrane 1 penetrate through the separation layer perpendicular to the support.

Evaluation Example 2

Calculation of Pore Density, Average Pore Diameter, and Standard Deviation of Pore Diameters of Separation Layer of Nanoporous Membrane The pore density, average pore diameter, and standard deviation of pore diameters of the separation layer of Membrane 1 were calculated through an analysis on the AFM photograph of FIG. 4A.

Figure 5:
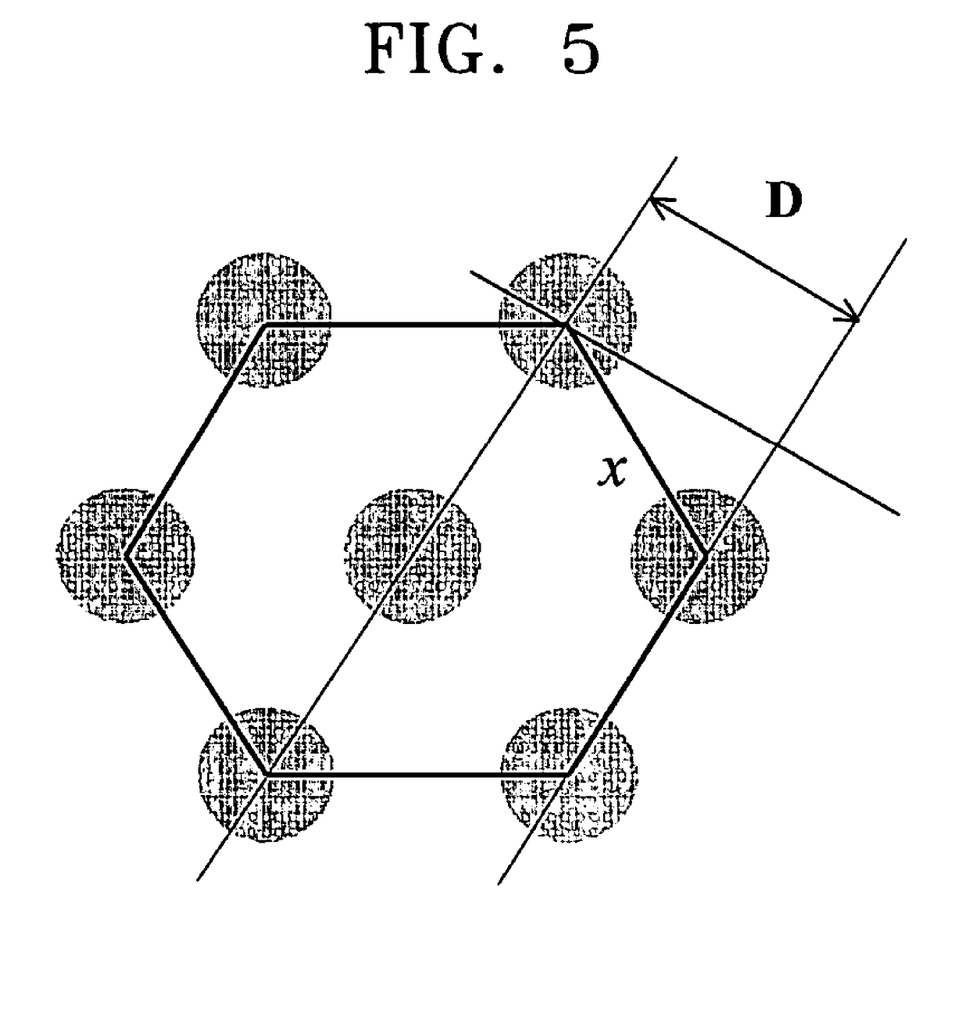
FIG. 5 is a diagram for explaining parameters used to calculate the pore density of the separation layer of the nanoporous membrane according to the present invention, in which relatively dark, circular portions correspond to pores, and a portion around the pores corresponds to a matrix of the separation layer.

The pore density was calculated according to Equations (1) and (2) below with the assumption that pores (relatively dark, circular portions in FIG. 5) are hexagonally packed in a matrix (a portion around the pores) of the separation layer as illustrated in FIG. 5.

In Equation (1), 3 was substituted for N under the assumption of the hexagonal packing of pores. In Equation (2), D, which indicates a domain spacing of the phase-separated copolymer layer as illustrated in FIG. 5, was 34.4 nm, which was measured using small-angle X-ray scattering (SAXS, 4C1 beamline of the Pohang Accelerator Laboratory (PAL)). The pore density of the separation layer of Membrane 1 was as high as $9.8 \times 10^{10}/cm^2$.

$$\text{Pore Density (number/cm}^2) = N/A \text{ nm}^2 \times 10^{14} \text{ nm}^2/cm^2 \quad \text{Equation (1)}$$

where N indicates the number of pores in a single regular hexagonal unit, and A is the area of the regular hexagonal unit.

$$A \text{ nm}^2 = 3^{1/2}/4 \times \{(D/\cos 30°)2 \times 6 \text{ nm}^2\} \quad \text{Equation (2)}$$

where D indicates a domain spacing in the phase-separated polymer layer.

In Equation (2), D/cos 30° corresponds to the distance between pores indicated by x in FIG. 5.

Figure 6:
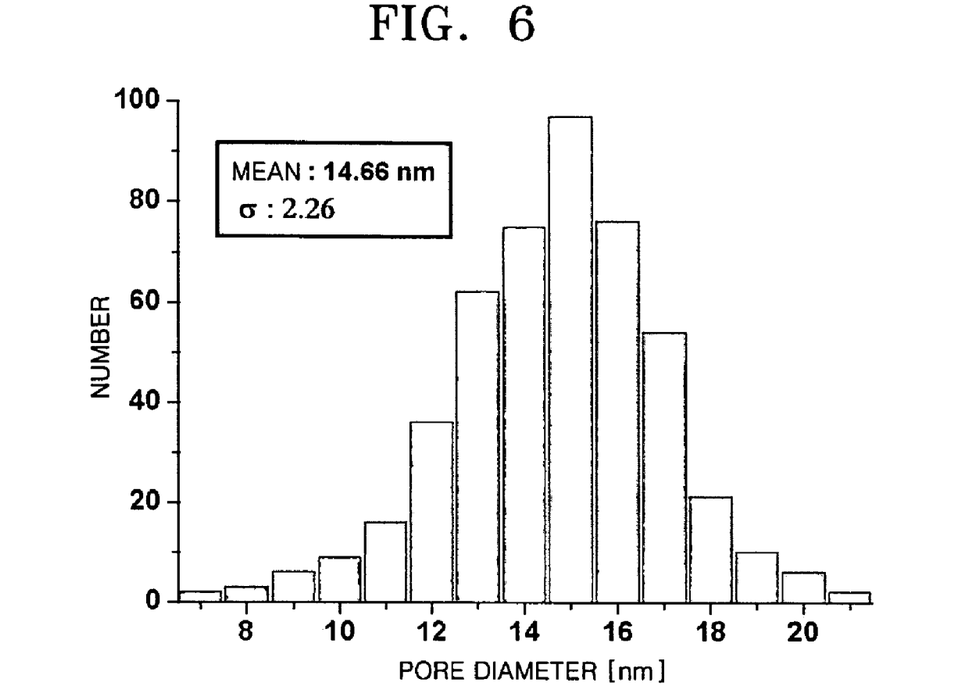
FIG. 6 is a graph of pore diameter versus number of pores in the separation layer of the nanoporous membrane according to the present invention.
Figure 7:
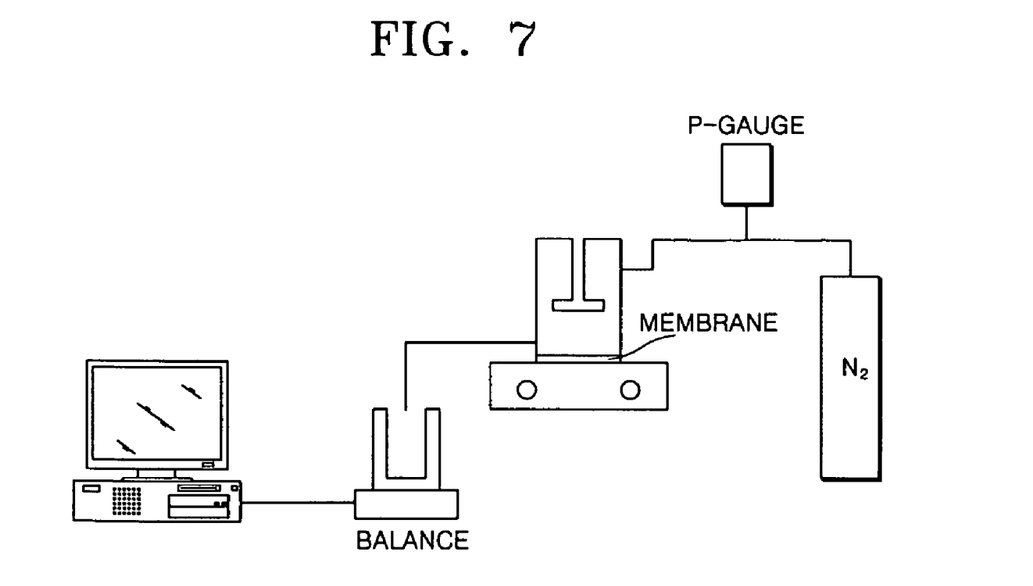
FIG. 7 illustrates a structure of a filtration apparatus used to measure the filtration performance of the nanoporous membrane according to the present invention.

FIG. 6 is a graph of pore diameter distribution in the separation layer of Membrane 1 obtained through an analysis of the AFM photograph of FIG. 4A. The average pore diameter and the standard deviation of pore diameters in the separation layer of Membrane 1 were calculated using the results in FIG. 6. The average pore diameter and the standard deviation of pore diameters in the separation layer were 14.66 nm and 2.26, respectively. Apparently, the pore diameter of the separation layer of Membrane 1 is in tens of nanometers. In addition, such a small standard deviation of pore diameters in the separation layer indicates that the pores in the separation layer of Membrane 1 are very uniform in size.

Evaluation Example 3

Evaluation of Flux of Membrane

Deionized water and a HRV 14-containing phosphate-buffered saline (PBS) solution were filtered through each of Membranes A, B, and 1 to evaluate the fluxes of the membranes. The HRV 14 (Human Rhinovirus type 14) as a kind of cold virus had an average diameter of 30.6 nm and a regular 20-gonal structure with a maximum diameter of 32.4 nm. The concentration of the HRV 14-containing PBS solution was 106 PFU. A filtration apparatus including a P-gauge, a balance, and a stirred cell (10 mL, Amicon 8010) as illustrated in FIG. 6 was used. Filtration was performed at 200 rpm, 0.1 bar, and room temperature.

Figure 8:
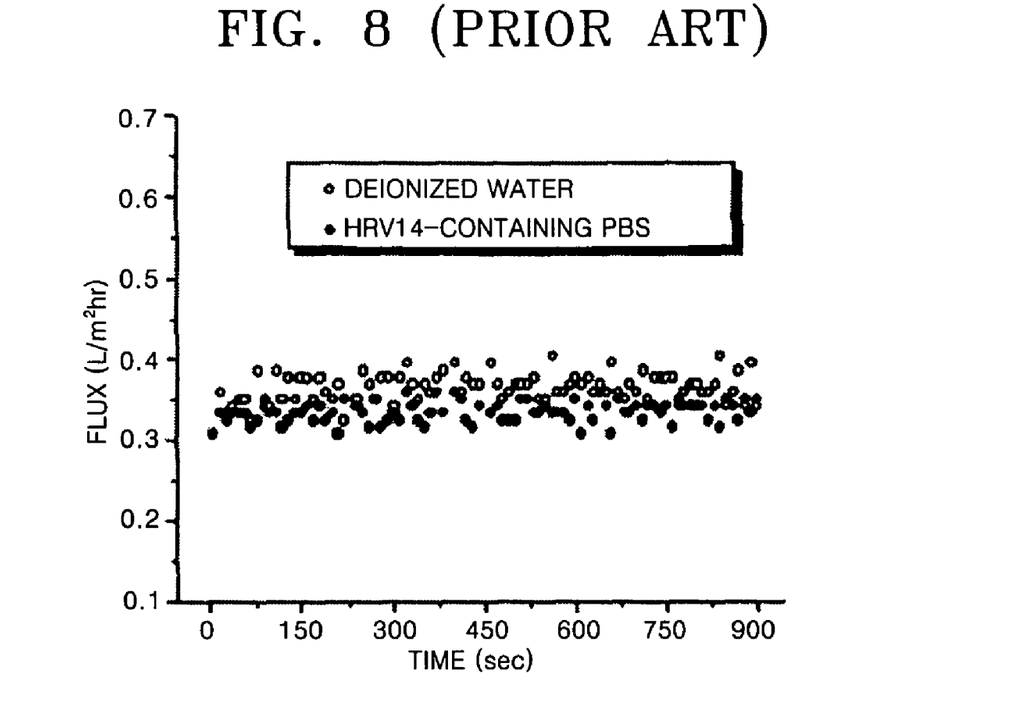
FIGS. 8 and 9 are graphs of flux of a conventional nanoporous membrane and the nanoporous membrane according to the present invention, respectively.
Figure 9:
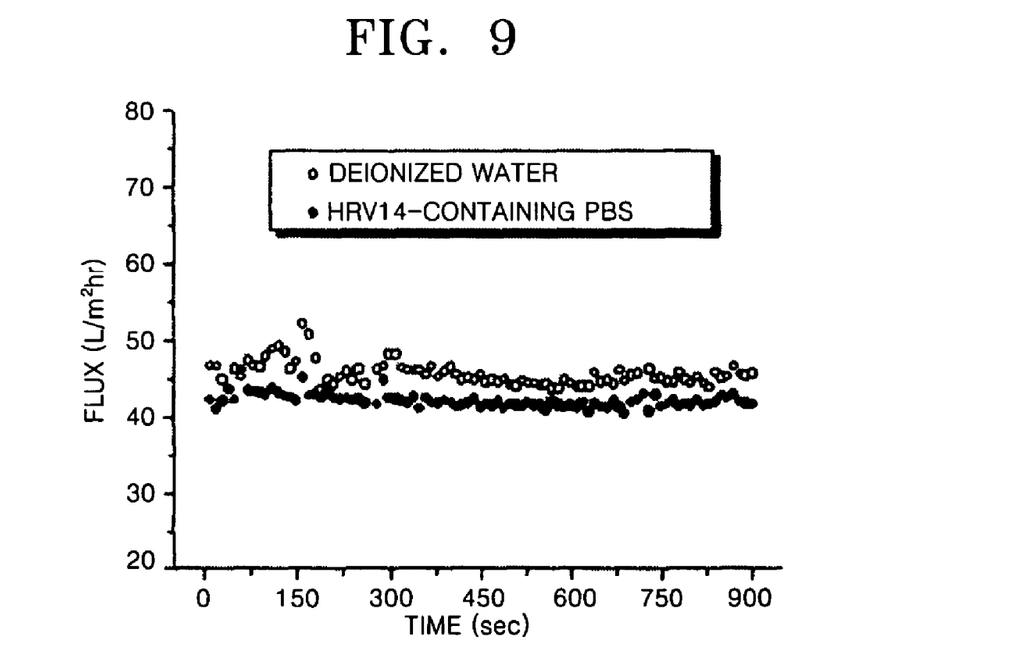

FIG. 8 is a graph of flux of Membrane A, and FIG. 9 is a graph of flux of Membrane 1. As is apparent from FIGS. 8 and 9, the flux of Membrane 1 according to the present invention is 100 times or more greater than the flux of the conventional Membrane A.

Evaluation Example 4

Evaluation of Membrane Selectivity to Virus

Figure 10A:
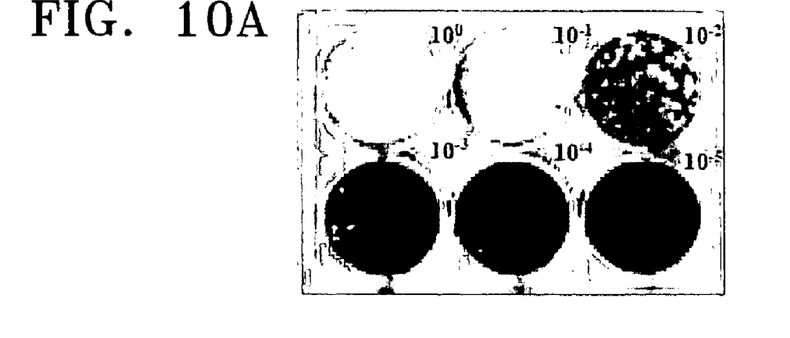
FIGS. 10A through 10D are photographs of the conventional nanoporous membrane and the nanoporous membrane according to the present invention showing the results of a plaque assay.
Figure 10B:
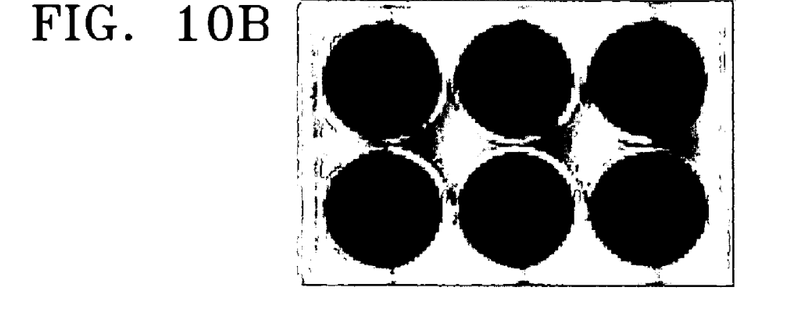
Figure 10C:
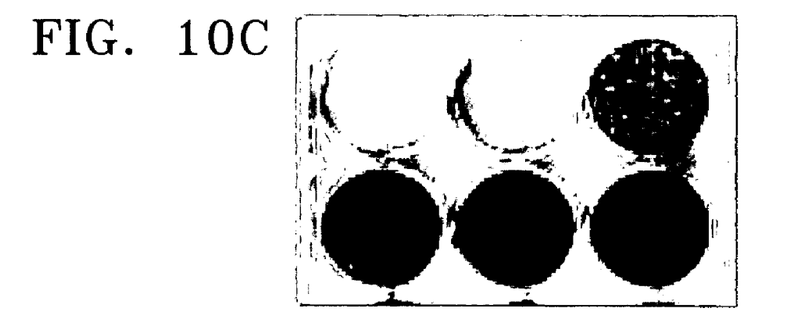
Figure 10D:
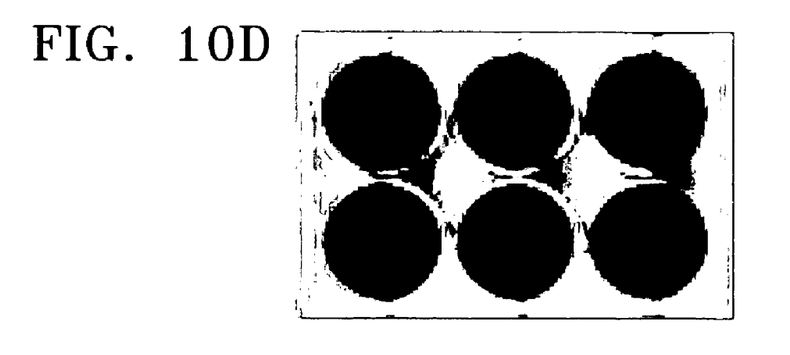

A plaque assay was performed on filtrates obtained by passing a HRV 14-containing PBS solution through Membranes A, B, and 1 to determine whether a virus existed in each of the filtrates. Each of the filtrates obtained through Membranes A, B, and 1 was diluted to one-tenth the original, and 0.2 mL of each filtrate was inoculated in a Hela/E cell and cultured at room temperature for 3 days to observe whether a plague was formed. The results of the plaque assays using Membranes A, B, and 1 are respectively shown in FIGS. 10B, 10C, and 10D. The results of a plaque assay on a control group prepared by inoculating the HRV 14-containing PBS solution, instead of the filtrates, in a Hela/E cell and culturing the same under the same conditions as described above is shown in FIG. 10A.

Referring to FIGS. 10A through 10D, no plaque is found in the filtrate passed through Membrane 1 according to the present invention. No plaque is found in the filtrate passed through the conventional Membrane A. However, considering that the flux of the conventional Membrane A is very smaller than the flux of Membrane 1 according to the present invention as described in Evaluation Example 3, the performance of Membrane 1 according to the present invention is superior to the conventional Membrane A in terms of both flux and selectivity to virus.

Figure 11:
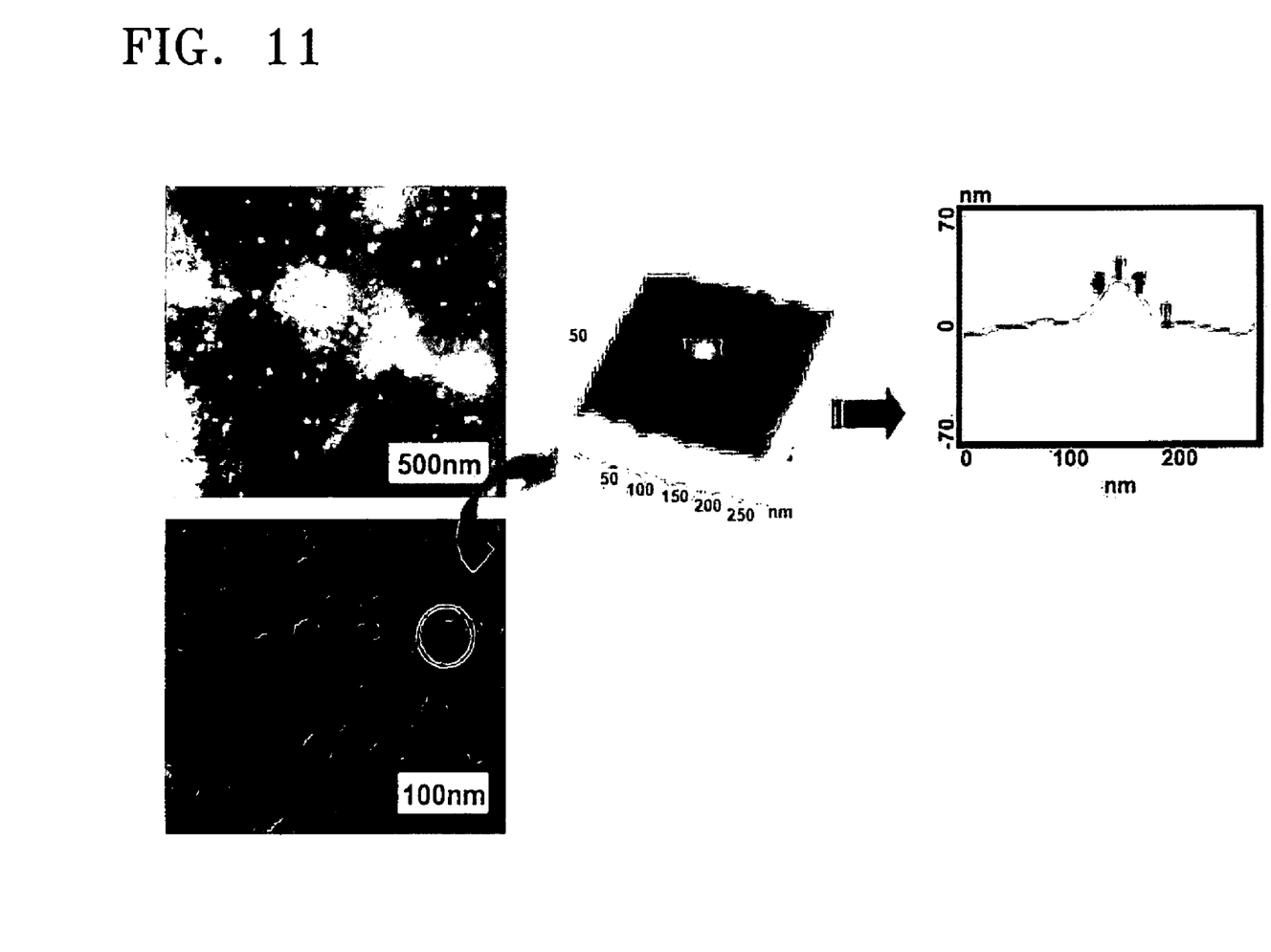
FIG. 11 is a photograph of the surface of the nanoporous membrane according to the present invention taken after a HRV 14-containing PBS solution was filtered through the nanoporous membrane.

FIG. 11 is an AFM photograph of the surface of Membrane 1 according to the present invention taken after the HRV 14-containing PBS solution was filtered through Membrane 1. FIG. 11 shows that a HRV 14 molecule that could not pass through pores in Membrane 1 remains on the surface of Membrane 1.

As described above, a nanoporous membrane according to the present invention includes the separation layer having a plurality of pores of several to tens of nanometers in diameter and a support supporting the separation layer. The pore density of the separation layer is very high, and the standard deviation of pore diameters of the separation layer is small. Furthermore, the support is highly permeable to a material that has passed through the separation layer. Thus, the nanoporous membrane according to the present invention has an improved flux and selectivity. Using the nanoporous membrane according to the present invention, nanometer-sized impurities inevitably resulting in various purification processes in various industrial fields can be filtered with a high productivity and high selectivity.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A nanoporous membrane comprising:
   a support; and
   a separation layer including a plurality of nano-sized pores at a density of $10^{10}/cm^2$ or greater and a matrix wherein said matrix of said separation layer includes an inner portion and a surface portion covering said inner portion.

2. The nanoporous membrane of claim 1, wherein an average pore diameter of the separation layer is in a range of 6-40 nm.

3. The nanoporous membrane of claim 1, wherein the standard deviation of diameters of the pores is 3 or less.

4. The nanoporous membrane of claim 1, wherein the pores penetrate through the separation layer perpendicular to a surface of the support.

5. The nanoporous membrane of claim 1, wherein the inner portion of the matrix is composed of polystyrene, and the surface portion of the matrix is composed of one of polyacryl, polyisoprene, polyethylene oxide, and polybutadiene.

6. The nanoporous membrane of claim 1, wherein the separation layer has a thickness of 10-200 nm.

7. A method of fabricating a nanoporous membrane, the method comprising:
   preparing a substrate;
   forming an etching layer on the substrate;

coating a phase-separable copolymer-containing composition on the etching layer and thermally treating the same to form a phase-separated polymer layer;

dipping the substrate having the phase-separated copolymer layer in an etching solution containing a support to fix the phase-separated copolymer layer to the support;

dipping the support having the phase-separated copolymer layer in an acid solution to form nano-sized pores in the phase-separated copolymer layer, thereby resulting in a separation layer including a plurality of nano-sized pores and a matrix on the support.

8. The method of claim 7, wherein the phase-separable copolymer-containing composition contains a phase-separable copolymer selected from the group consisting of a polystyrene-block-polyacryl copolymer, a polystyrene-block-polyisoprene copolymer, a polystyrene-block-polybutadiene copolymer, and a derivative thereof.

9. The method of claim 7, wherein the phase-separable copolymer-containing composition further contain a homopolymer selected from the group consisting of a polyacryl homopolymer, a polyisoprene homopolymer, a polybutadiene homopolymer, and a derivative thereof.

10. The method of claim 7, wherein the etching solution is selected from the group consisting of an aqueous hydrofluoric acid solution, an aqueous phosphoric acid solution, and an aqueous hydroxide solution, and the concentration of the etching solution is in a range of 5-30 wt %.

11. The method of claim 7, wherein the acid solution is one of acetic acid and isopropyl alcohol, and the concentration of the acid solution is in a range of 10-50 wt %.

12. The method of claim 7, wherein the separation layer of the nanoporous membrane has a pore density of $10^{10}/cm^2$ or greater.

13. The method of claim 7, wherein the separation layer of the nanoporous membrane has an average pore diameter of 6-40 nm.

14. The method of claim 7, wherein the standard deviation of diameters of the pores in the separation layer of the nanoporous membrane is less than 3.

15. The method of claim 7, wherein the pores penetrating through the separation layer of the nanoporous membrane are perpendicular to a surface of the support.

16. The method of claim 7, wherein the matrix of the separation layer of the nanoporous membrane includes an inner portion and a surface portion covering the inner portion.

17. The method of claim 16, wherein the inner portion of the matrix is composed of polystyrene, and the surface portion of the matrix is composed of one of polyacryl, polyisoprene, polyethylene oxide, and polybutadiene.

18. The method of claim 7, wherein the separation layer of the nanoporous membrane has a thickness of 10-200 nm.

19. A nanoporous membrane fabricated using the method of claim 7.

* * * * *